United States Patent
Ohmura et al.

(10) Patent No.: US 10,291,095 B2
(45) Date of Patent: May 14, 2019

(54) MOTOR AND METHOD FOR MANUFACTURING MOTOR

(71) Applicant: MINEBEA MITSUMI INC., Kitasaku-gun, Nagano (JP)

(72) Inventors: Jun Ohmura, Hamamatsu (JP); Makoto Otsuka, Kakegawa (JP)

(73) Assignee: MINEBEA MITSUMI INC., Miyota (JP)

( * ) Notice: Subject to any disclaimer, the term of this patent is extended or adjusted under 35 U.S.C. 154(b) by 53 days.

(21) Appl. No.: 15/479,894

(22) Filed: Apr. 5, 2017

(65) Prior Publication Data
US 2017/0302128 A1 Oct. 19, 2017

(30) Foreign Application Priority Data
Apr. 13, 2016 (JP) ................. 2016-080463

(51) Int. Cl.
| | |
|---|---|
| H02K 5/08 | (2006.01) |
| H02K 5/22 | (2006.01) |
| H02K 11/25 | (2016.01) |
| H02K 15/10 | (2006.01) |
| H02K 15/00 | (2006.01) |
| H02K 15/14 | (2006.01) |

(52) U.S. Cl.
CPC .............. *H02K 5/225* (2013.01); *H02K 5/08* (2013.01); *H02K 11/25* (2016.01); *H02K 15/0062* (2013.01); *H02K 15/10* (2013.01); *H02K 15/14* (2013.01)

(58) Field of Classification Search
CPC ..... H02K 5/225; H02K 11/25; H02K 15/0062

USPC ............................................ 310/71
See application file for complete search history.

(56) References Cited

U.S. PATENT DOCUMENTS

| | | | |
|---|---|---|---|
| 4,924,124 A | 5/1990 | Kato | |
| 4,926,540 A | 5/1990 | Kato | |
| 5,861,689 A * | 1/1999 | Snider | H02K 3/522 310/71 |
| 2010/0000786 A1 | 1/2010 | Yoshizawa et al. | |
| 2014/0361648 A1* | 12/2014 | Shirakata | H02K 11/046 310/52 |
| 2015/0084447 A1* | 3/2015 | Kamiya | H02K 1/12 310/43 |

(Continued)

FOREIGN PATENT DOCUMENTS

| | | |
|---|---|---|
| CA | 2 954 239 A1 | 1/2016 |
| CN | 101621227 A | 1/2010 |

(Continued)

OTHER PUBLICATIONS

Jul. 18, 2018 Decision to Grant issued in European Patent Application No. 17164836.3.

(Continued)

*Primary Examiner* — Terrance L Kenerly
(74) *Attorney, Agent, or Firm* — Oliff PLC (57) ABSTRACT

A motor includes a stator including a terminal and a casing that houses the stator, in which the casing includes a casing body with high thermal conductivity that includes an opening in which the terminal is disposed and houses the stator and a casing block disposed in the opening and with an insulating property and high thermal conductivity, and the casing block includes a housing part that houses a distal end portion of the terminal.

10 Claims, 8 Drawing Sheets

(56) References Cited

U.S. PATENT DOCUMENTS

2015/0333594 A1    11/2015    Kuroda et al.

FOREIGN PATENT DOCUMENTS

| JP | S63-039443 A | 2/1988 | | |
|---|---|---|---|---|
| JP | H2-285944 A | 11/1990 | | |
| JP | H03-070047 U | 4/1991 | | |
| JP | 2005-065374 A | 3/2005 | | |
| JP | 2006-085960 A | 3/2006 | | |
| JP | 2006085960 | * 3/2006 | ............. | H01R 43/24 |
| JP | 2009-284659 A | 12/2009 | | |
| JP | 2009284659 | * 12/2009 | .............. | H02K 5/22 |
| JP | 2012-005175 A | 1/2012 | | |
| JP | 2015-070634 A | 4/2015 | | |
| JP | 2015-133772 A | 7/2015 | | |
| JP | 2015-149863 A | 8/2015 | | |
| JP | 2015-220843 A | 12/2015 | | |
| JP | 2016-028542 A | 2/2016 | | |

OTHER PUBLICATIONS

Aug. 28, 2017 Extended Search Report issued in European Patent Application No. 17164836.3.
Jul. 3, 2018 Office Action issued in Japanese Patent Application No. 2016-080463.
Oct. 9, 2018 Office Action issued in Chinese Patent Application No. 201710205680.4.

* cited by examiner

MOTOR AND METHOD FOR MANUFACTURING MOTOR

CROSS REFERENCE TO RELATED APPLICATIONS

This application claims the benefit of Japanese Patent Application No. 2016-080463, filed Apr. 13, 2016, which is hereby incorporated by reference in its entirety.

BACKGROUND

Technical Field

The present disclosure relates to a motor and a method for manufacturing the motor.

Background

In a motor, a rotor and a stator are generally housed in a casing, and passing a current through a coil of the stator causes the rotor to rotate (see Japanese Patent Application Laid-Open No. 2016-28542).

In order to rotate the rotor at a high speed within a limited voltage, the largest possible amount of current may need to be passed through the coil of the stator.

However, when a large amount of current is passed through the coil, the coil is heated and the heat generation causes a temperature of the coil itself to rise, which causes a resistance value of the coil to increase, making it more difficult for the current to flow.

This leads to a problem that the rotation speed of the rotor does not increase.

The present disclosure is related to providing a motor and a method for manufacturing the motor capable of efficiently dissipating heat generated in the coil of the stator or the like.

SUMMARY

In accordance with one aspect of the present disclosure:
(1) A motor includes a stator including a terminal and a casing that houses the stator, in which the casing includes a casing body with high thermal conductivity that includes an opening in which the terminal is disposed and houses the stator and a casing block disposed in the opening and with an insulating property and high thermal conductivity, and the casing block includes a housing part that houses a distal end portion of the terminal.
(2) In the above configuration (1), a flexible material is used for the casing block, the casing block is greater in size than the opening and the casing block is press-fitted into the opening.
(3) In the above configuration (1), the casing block is smaller in size than the opening and a gap between the casing block and the opening is filled with a member with high thermal conductivity.
(4) In any one of the above configurations (1) to (3), the housing part is smaller in size than the distal end portion of the terminal and the distal end portion of the terminal is press-fitted into the housing part.
(5) In any one of the above configurations (1) to (3), the housing part is greater in size than the distal end portion of the terminal and a gap between the housing part and the distal end portion of the terminal is filled with a member with high thermal conductivity.
(6) In any one of the above configurations (1) to (5), the stator includes a cylindrical stator core, the terminal includes the distal end portion, a rear end portion on an opposite side of the distal end portion and a bridge part that bridges the distal end portion and the rear end portion, and the bridge part has an arc shape along an end face of the stator core.
(7) The above configuration (6) includes two of the terminals disposed separate from each other and one short terminal having only a portion corresponding to a rear end portion of the terminal, and the two terminals cross the bridge part, the rear end portions are disposed on the same side with reference to an axis that passes a center position of the stator core, the short terminal is separate from the two terminals and provided so as to be located between the rear end portions of the two terminals.
(8) Any one of the above configurations (1) to (7) includes at least one temperature sensor and the temperature sensor is attached to the terminal.
(9) In any one of the above configurations (1) to (7), the housing part is a bottomed concave part including an insertion port of the distal end portion of the terminal inside the casing.
(10) A method for manufacturing a motor is a method for manufacturing the motor according to any one of the above configurations (1) to (9), the method including an arranging step of arranging a stator core in a metal die, causing the metal die to hold a frame of a lead frame including a terminal part and the frame that holds the terminal part and arranging the lead frame in the metal die, a molding step of supplying an insulator material to the metal die, insulating a portion that becomes a terminal of the terminal part from the stator core and molding the insulator that integrates the terminal and the stator core, and a cutting step of cutting the terminal part so as to form the distal end portion of the terminal housed in the housing part of the casing block.

According to present disclosure, it is possible to provide a motor and a method for manufacturing the motor capable of efficiently dissipating heat generated in the coil of the stator or the like.

DETAILED DESCRIPTION

Hereinafter, a mode for carrying out the present disclosure (hereinafter referred to as "embodiment") will be described in detail with reference to the accompanying drawings.

Note that identical elements are assigned identical reference numerals throughout the entire description of the embodiment.

Figure 1:
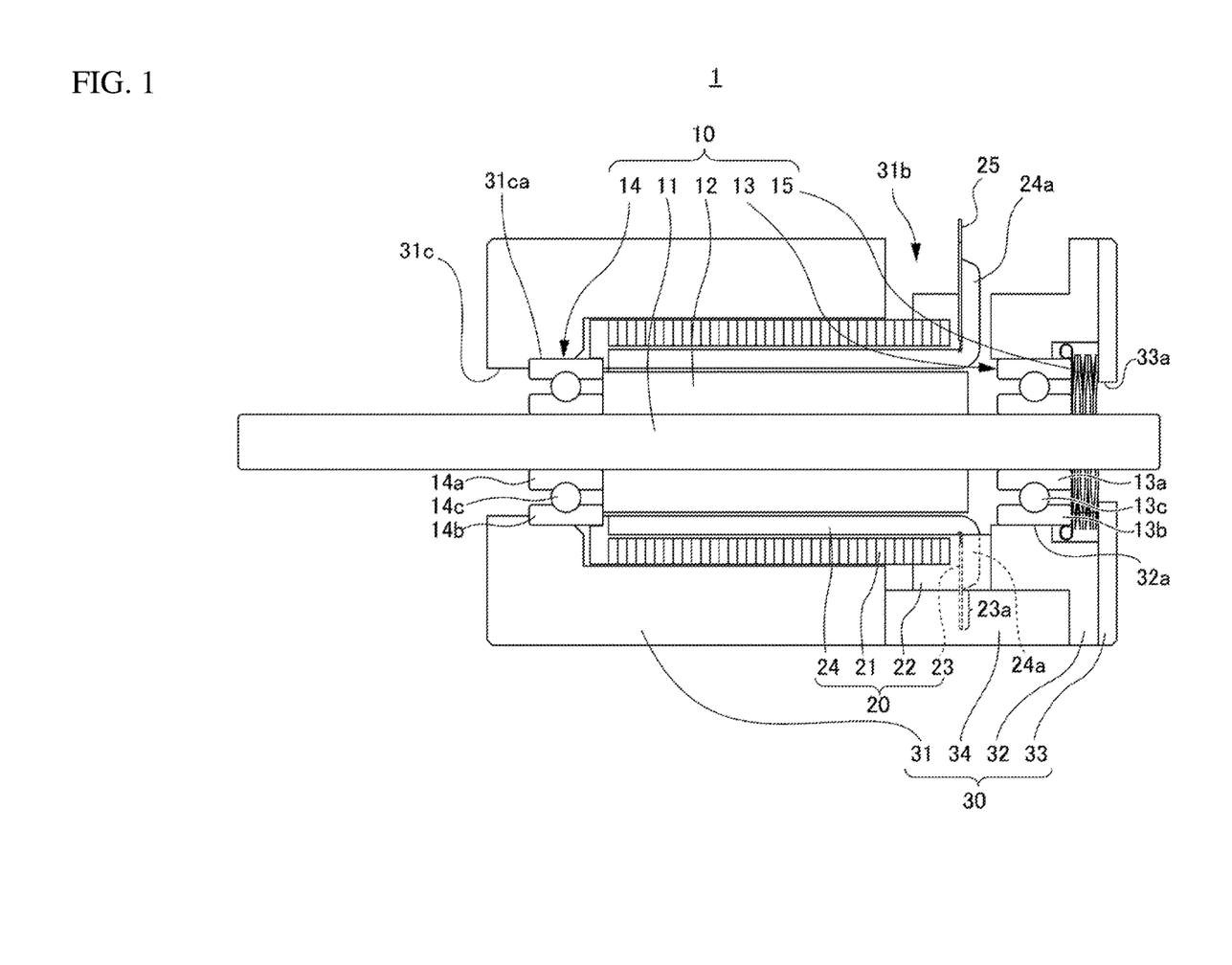
FIG. 1 is a cross-sectional view along a shaft of a motor according to an embodiment of the present disclosure.
Figure 2:
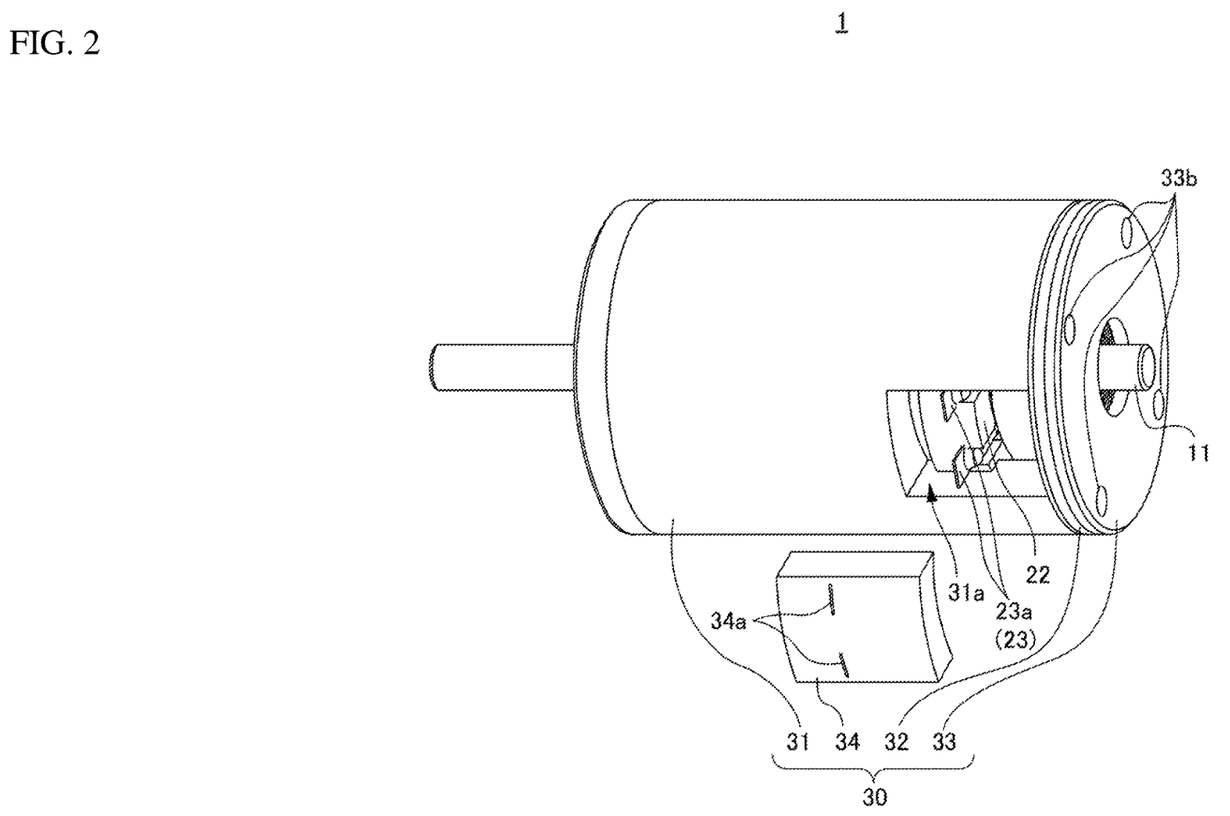
FIG. 2 is a partially exploded perspective view of the motor according to the embodiment of the present disclosure.

FIG. 1 is a cross-sectional view along a shaft 11 of a motor 1 of an embodiment according to the present disclosure and FIG. 2 is a partially exploded perspective view of the motor 1.

As shown in FIG. 1, the motor 1 is provided with a rotor 10, a stator 20 and a casing 30.

(Rotor)

The rotor 10 includes the shaft 11 and a magnet 12 fixed to an outer circumferential surface of the shaft 11.

Although a case is shown in the present embodiment where the magnet 12 is directly fixed to the outer circumferential surface of the shaft 11, a rotor yoke may be fixed to the outer circumferential surface of the shaft 11 and the magnet 12 may be fixed to the outer circumferential surface of the rotor yoke.

The rotor 10 is provided with a first bearing 13, a second bearing 14, and a spring 15 that adds a preload between the first bearing 13 and the second bearing 14.

The first bearing 13 is disposed at a position closer to a first end side (right side in the figure) of the shaft 11 than the magnet 12 and fixed to the shaft 11, and the second bearing 14 is disposed at a position closer to a second end side (left side in the figure) of the shaft 11 than the magnet 12 and fixed to the shaft 11.

In the present embodiment, a rolling bearing is used as the first bearing 13, and the first bearing 13 is provided with an inner wheel 13a fixed to the shaft 11, an outer wheel 13b and a ball 13c interposed between the inner wheel 13a and the outer wheel 13b to bridge the inner wheel 13a and the outer wheel 13b so as to make the wheels mutually rotatable.

Note that a method of fixing between the shaft 11 and the inner wheel 13a is not particularly limited, but, for example, fixing by press-fitting whereby the shaft 11 is press-fitted into the inner wheel 13a or adhesion fixing using an adhesive may also be used.

In the present embodiment, a rolling bearing is also used for the second bearing 14 and the second bearing 14 is provided with an inner wheel 14a fixed to the shaft 11, an outer wheel 14b and a ball 14c interposed between the inner wheel 14a and the outer wheel 14b to bridge the inner wheel 14a and the outer wheel 14b so as to make the wheels mutually rotatable.

Note that for the second bearing 14 as well as the first bearing 13, a method of fixing between the shaft 11 and the inner wheel 14a is not particularly limited, but, for example, fixing by press-fitting whereby the shaft 11 is press-fitted into the inner wheel 14a or adhesion fixing using an adhesive may also be used.

On the other hand, the outer wheel 14b of the second bearing 14 is, for example, fixed to the casing 30 and the outer wheel 13b of the first bearing 13 is loose-fitted to the casing 30.

A spring 15 is disposed on a first end side (right side in the figure) of the outer wheel 13b of the first bearing 13 to urge the outer wheel 13b toward a second end side (left side in the figure) of the outer wheel 13b.

For this reason, a preload is added between the inner wheel 13a and the outer wheel 13b of the first bearing 13, an urging force by the spring 15 is transmitted to the inner wheel 14a of the second bearing 14 via the shaft 11, and a preload is also added between the inner wheel 14a and the outer wheel 14b of the second bearing 14.

(Stator)

The stator 20 is provided with a cylindrical stator core 21 formed by laminating electromagnetic steel sheets, an insulator 22 provided on an inner surface and an end face of the stator core 21 and a coil 24 disposed inside the stator core 21 so as to be insulated from the stator core 21 via the insulator 22.

Note that in the rotor 10, the magnet 12 is attached to the casing 30 so as to be rotatable with respect to the stator 20 through the first bearing 13 and the second bearing 14 so as to be located inside the coil 24 via a gap from the coil 24.

Figure 3:
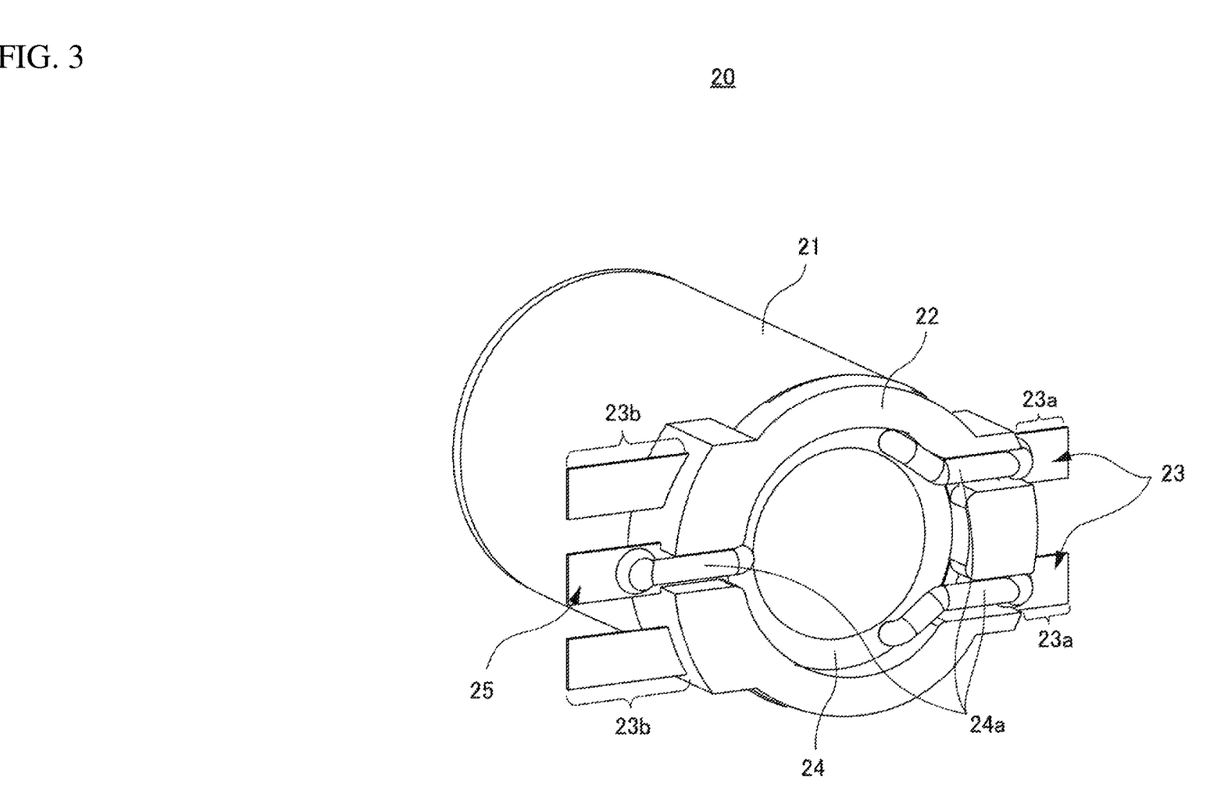
FIG. 3 is a perspective view illustrating only the stator according to the embodiment of the present disclosure.
Figure 4:
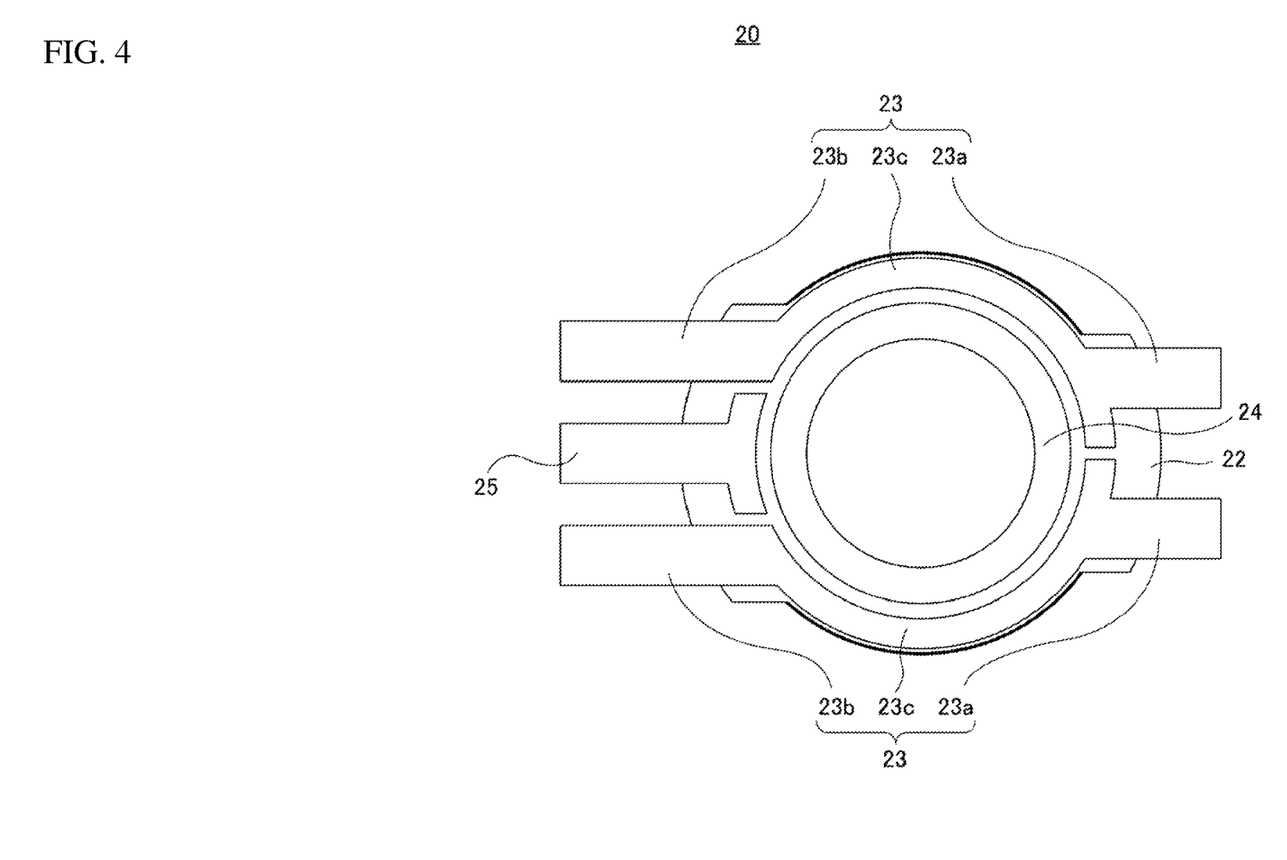
FIG. 4 is a plan view of the stator according to the embodiment of the present disclosure when a first end side of the stator is seen from the front.

FIG. 3 is a perspective view illustrating only the stator 20 and FIG. 4 is a plan view of the stator 20 when a first end side thereof is seen from the front.

Note that lines are omitted in FIG. 3, which indicates the fact that electromagnetic steel sheets of the stator core 21 are laminated.

In FIG. 4, illustrations of part of the insulator 22 and end portions 24a of the coil 24 are omitted.

As shown in FIG. 1 and FIG. 3, the stator 20 is provided with two terminals 23 and one short terminal 25 provided on a first end side of the stator core 21.

The two terminals 23 and one short terminal 25 are integrated with the stator core 21 so as to be insulated from the stator core 21 by the insulator 22.

As shown in FIG. 4, the two terminals 23 have the same shape and are arranged linearly symmetrically at a distance from each other.

More specifically, the terminal 23 includes a distal end portion 23a, a rear end portion 23b on the opposite side of the distal end portion 23a and a bridge part 23c that bridges the distal end portion 23a and the rear end portion 23b, and the bridge part 23c has an arc shape along the end face on the first end side of the cylindrical stator core 21 (not shown).

Note that the rear end portions 23b of the two terminals 23 are terminal parts connected to a power supplying connector.

A portion similar to the rear end portions 23b of the terminal 23, that is, one short terminal 25 making up the terminal portion connected to the power supplying connector is provided so as to be separate from the two terminals 23 and located between the rear end portions 23b of the terminal 23 arranged on the same side of the stator 20.

End portions 24a of the coil 24 corresponding to their respective phases are connected to the two terminal 23 and one short terminal 25 arranged in this way as shown in FIG. 3.

Note that since the present embodiment illustrates a case of a three-phase type motor, the stator 20 includes the two terminals 23 and one short terminal 25 to which the end portions 24a of the coil 24 are connected, but the number of terminals 23 and short terminals 25 may be increased or decreased according to the number of phases required.

(Casing)

As shown in FIG. 1, the casing 30 is provided with a casing body 31, a first end side (right side in the figure) of which is an opening end and which makes up a bottomed stator housing part that houses the stator 20, a casing end face part 32 provided at the open end (right side in the figure)

of the casing body 31, a casing cap 33 provided on a first end side (right side in the figure) of the casing end face part 32 and a casing block 34.

The casing body 31 is provided with a through hole 31c that leads out a second end side (left side in the figure) of the shaft 11 at a base part and a fixing part 31ca that press-fixes the outer wheel 14b of the second bearing 14 is formed on a first end side (right side in the figure) of the through hole 31c.

The casing end face part 32 is also provided with a through hole 32a that leads out of the first end side (right side in the figure) of the shaft 11, and the first bearing 13 is loose-fitted into the through hole 32a and the spring 15 is housed in the through hole 32a.

More specifically, the through hole 32a has a diameter on the second end side (left side in the figure) that allows the first bearing 13 to be loose-fitted and has a diameter on the first end side (right side in the figure) that allows the spring 15 to be housed.

The casing cap 33 is also provided with a through hole 33a that leads out of the first end side (right side in the figure) of the shaft 11, and since the through hole 33a has a diameter smaller than the outside diameter of the spring 15, the casing cap 33 plays the role as a receiving part that receives the first end side (right side in the figure) of the spring 15.

(Improvement of Heat Dissipation)

Next, a configuration for improving heat dissipation will be described in detail.

As shown in FIG. 2, a substantially rectangular opening 31a which is cut off from the first end side (right side in the figure) is formed in the casing body 31 and the terminal 23 of the stator 20 is disposed in the opening 31a.

The casing block 34 is disposed in the opening 31a so as to close the opening 31a of the casing body 31 (see FIG. 1).

As shown in FIG. 2, the casing block 34 includes slit-like housing parts 34a that house the distal end portions 23a of the terminal 23 of the stator 20, and when the casing block 34 is disposed in the opening 31a of the casing body 31 as shown in FIG. 1, the distal end portions 23a of the terminal 23 of the stator 20 are housed in the housing parts 34a.

As shown in FIG. 1, the casing body 31 includes an opening 31b in which the rear end portions 23b on the opposite side of the distal end portion 23a of the terminal 23 (see FIG. 3) and the short terminal 25 are disposed, and this opening 31b is also formed into a substantially rectangular shape cut off from the first end side (right side in the figure) of the casing body 31 as in the case of the opening 31a.

Note that the rear end portions 23b and the short terminal 25 are the terminal parts connected to the power supplying connector and the opening 31b is provided with a connector housing that detachably receives a power supplying connector (not shown) and houses the rear end portions 23b and the short terminal 25.

A material with high thermal conductivity such as metal (material having a coefficient of thermal conductivity of at least 1 W/(m·K) is preferable) is used for the casing body 31 and a material with an insulating property such as silicon rubber and with high thermal conductivity (material having a coefficient of thermal conductivity of at least 1 W/(m·K) is preferable) is used for the casing block 34.

That is, materials with excellent thermal conductivity and high heat dissipation are used for the casing body 31 and the casing block 34.

Then, heat from the coil 24 is transmitted to the casing block 34 via the two terminals 23 and further transmitted to the casing body 31 via the casing block 34, which means that the efficiently transmitted heat is dissipated to the outside from the casing block 34 and the casing body 31.

That is, the casing block 34 and the casing body 31 play the role of a heat sink and can increase heat dissipation performance.

In order to perform the above-described heat conduction efficiently, there is preferably no gap between the two terminals 23 and the casing block 34 and between the casing block 34 and the casing body 31.

Thus, it is preferable to use a flexible material such as silicon rubber for the casing block 34, adopt a size greater than the size of the opening 31a of the casing body 31 and press-fit the casing block 34 into opening 31a and thereby prevent a gap from being produced between the casing block 34 and the casing body 31.

Note that "flexibility" referred to here means that deformation caused by press-fitting is tolerable.

However, without necessarily sticking to press-fitting, it is also possible to make the casing block 34 a little smaller in size than the opening 31a of the casing body 31 and fill the gap produced between the casing block 34 and the opening 31a of the casing body 31 with a member with high thermal conductivity (the coefficient of thermal conductivity is preferably equivalent to or higher than that of the casing block 34).

It may be possible to form a member with high thermal conductivity to fill the gap produced between the casing block 34 and the opening 31a of the casing body 31, for example, by filling the gap with an adhesive with high thermal conductivity or the like.

In this case, since press-fitting is not involved, the material used for the casing block 34 is not required to have flexibility and it is possible to use a material having an insulating property such as ceramics and with high thermal conductivity.

However, given the time taken to charge the adhesive or the like, it is preferable to use a flexible material as in the case of the present embodiment.

When a flexible material is used for the casing block 34 as in the case of the present embodiment, it is preferable to prevent a gap from being produced between the terminals 23 and the casing block 34 by making the housing parts 34a that house the distal end portions 23a of the terminals 23 of the casing block 34 (see FIG. 2) smaller in size than the distal end portions 23a of the terminals 23 and press-fitting the distal end portions 23a into the housing parts 34a.

However, when the material used for the casing block 34 is not flexible as described above, it may be possible to make the housing parts 34a greater in size than the distal end portions 23a of the terminals 23 and fill the gap produced between the housing part 34a and the distal end portion 23a with a member with an insulating property and with high thermal conductivity.

For example, it may be possible to fill the gap with an adhesive having an insulating property and high thermal conductivity to thereby form a member having an insulating property and high thermal conductivity that fills the gap produced between the housing parts 34a of the casing block 34 and the distal end portions 23a of the terminals 23.

However, when the adhesive does not protrude stick out, the adhesive need not be limited to having an insulating property and the adhesive only needs to have high thermal conductivity.

However, since the distal end portions 23a of the terminals 23 are connected to the rear end portions 23b of the terminals 23 connected to the power supplying connector via the bridge parts 23c as shown in FIG. 4, a current flows through the distal end portions 23a as well.

For this reason, in order to prevent the current from flowing into the casing body 31, the casing block 34 is made of a material having an insulating property and the distal end portions 23a of the terminals 23 is set to have such a length that the distal end portions 23a do not protrude from the casing block 34, if the housing part 34a of the casing block 34 is through-hole, when the casing block 34 is pushed into the casing 30, the distal end portions 23a of the terminals 23 may possibly protrude from the housing part 34a.

Thus, in the present embodiment, the housing parts 34a are formed as slits that penetrate the casing block 34, but from the standpoint of safety, the housing parts 34a are preferably formed as bottomed concave parts having an insertion port of the distal end portions 23a of the terminals 23 inside the casing 30 to more reliably prevent the distal end portion 23a protrude to the outside.

Note that the shape of the bottomed concave portion need not be limited to the concave shape that surrounds the periphery of the distal end portions 23a, but the shape may be a concave part having a groove-like shape.

(Motor Manufacturing Method)

Next, an example of the method of manufacturing the motor 1 in the above-described configuration will be described.

As a rough flow of the procedure for manufacturing the motor 1, a step of manufacturing respective parts of an assembly in which the rotor 10 and the stator 20 are assembled together and the casing 30 is executed and assembly is then performed, but the step of manufacturing the stator 20 is preferably executed as follows.

Note that though details will be described later, the spring 15 is not attached yet in a state of the assembly.

Figure 5:
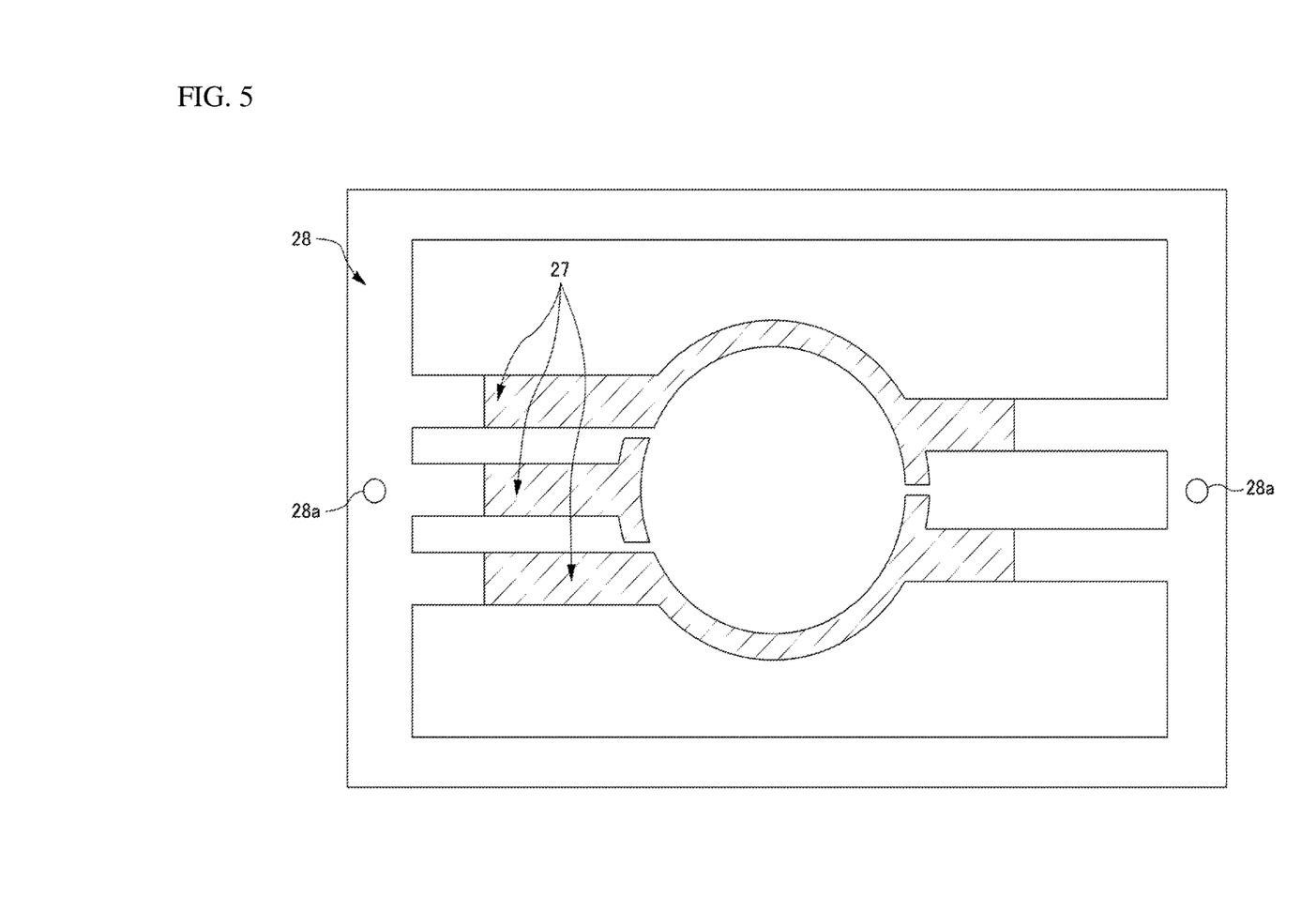
FIG. 5 is a plan view illustrating a terminal member used in a manufacturing step of the stator according to the embodiment of the present disclosure.

FIG. 5 is a plan view illustrating a terminal member used in the manufacturing step of the stator 20.

As shown in FIG. 5, the terminal member is configured in a state of a lead frame including terminal parts 27 and a frame 28 that holds the terminal parts 27.

The frame 28 is provided with positioning through holes 28a on both end portion sides of the terminal part 27 for setting it in a molding metal die.

Figure 6:
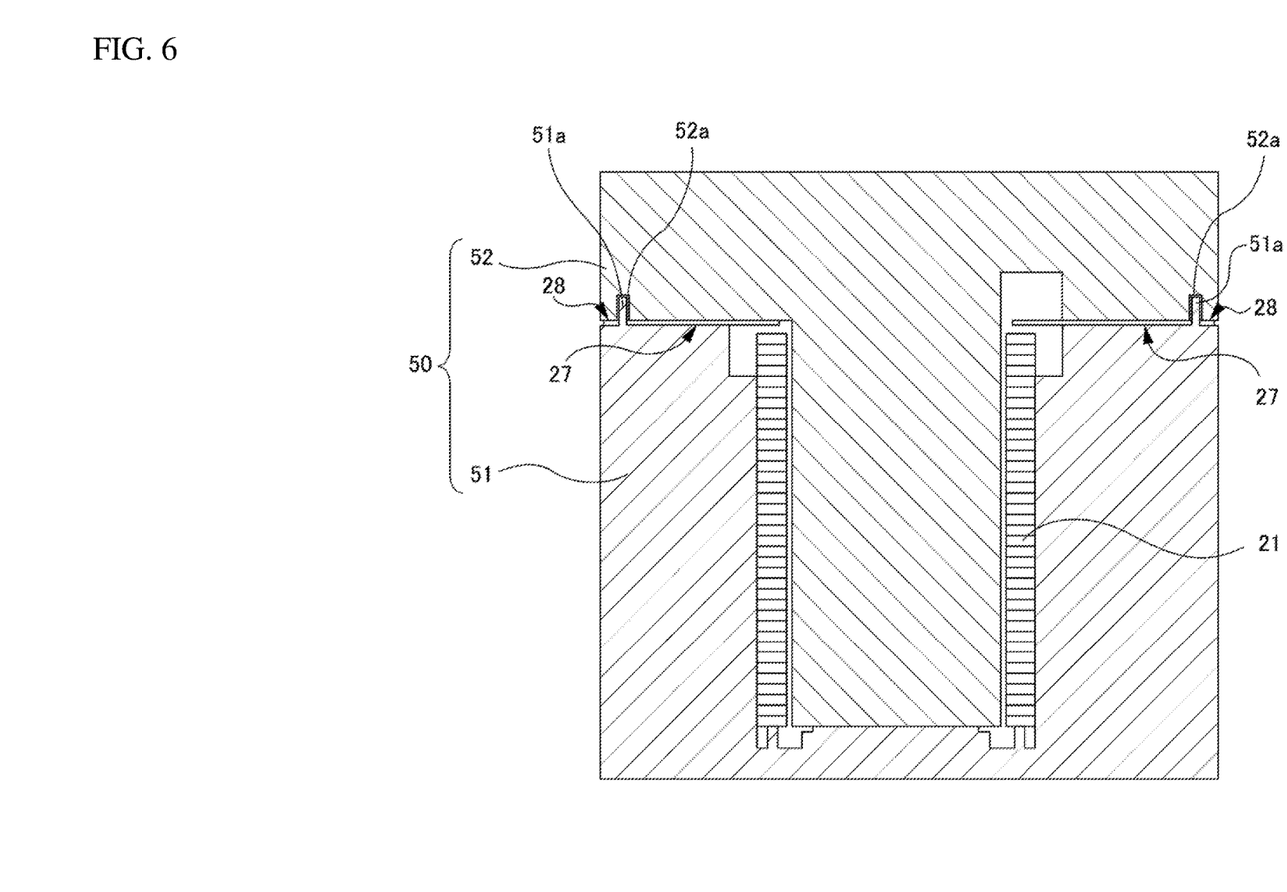
FIG. 6 is a cross-sectional view for describing molding of an insulator of the stator according to the embodiment of the present disclosure.

FIG. 6 is a diagram provided for describing molding of the insulator 22 of the stator 20.

As shown in FIG. 6, an arranging step is performed first, in which the stator core 21 is disposed in a metal die 50, the metal die 50 is caused to hold the frames 28 which are a lead frame including the terminal parts 27 and the frames 28 that hold the terminal parts 27 and the lead frames are disposed in the metal die 50.

The metal die 50 includes a lower metal die 51 in which the stator core 21 is housed and an upper metal die 52 to be combined with the lower metal die 51 and the lower metal die 51 is provided with positioning bosses 51a inserted into the positioning through holes 28a of the lead frame shown in FIG. 5.

Therefore, it is possible to set the stator core 21 and the lead frame in the lower metal die 51 by only setting the lead frame in the lower metal die 51 so as to pass the positioning bosses 51a of the lower metal die 51 into the positioning through holes 28a of the lead frame after housing the stator core 21 in the lower metal die 51 so that the positional relationship between the stator core 21 and the lead frame becomes a predetermined positional relationship.

Since the upper metal die 52 is provided with the boss insertion concave portions 52a that receive the positioning bosses 51a at positions corresponding to the positioning bosses 51a of the lower metal die 51, it is possible to set the upper metal die 52 in a predetermined state by setting the stator core 21 and the lead frame in the lower metal die 51 as described above and then align the upper metal die 52 with the lower metal die 51 so that the positioning bosses 51a of the lower metal die 51 are inserted into the boss insertion concave portion 52a.

When the upper metal die 52 is combined with the lower metal die 51 in this way, a space that matches the shape of the insulator 22 is formed, and therefore a material of the insulator 22 is supplied to the metal die 50 so as to fill the space with the material of the insulator 22.

By supplying the material of the insulator 22 to the metal die 50 in this way, a molding step of molding the insulator 22 is performed in which the portions that become the terminals 23 and the short terminal 25 of the terminal parts 27 (see the hatched areas in FIG. 5) are insulated from the stator core 21, and the portions that become the terminals 23 and the short terminal 25 are integrated with the stator core 21.

Figure 7:
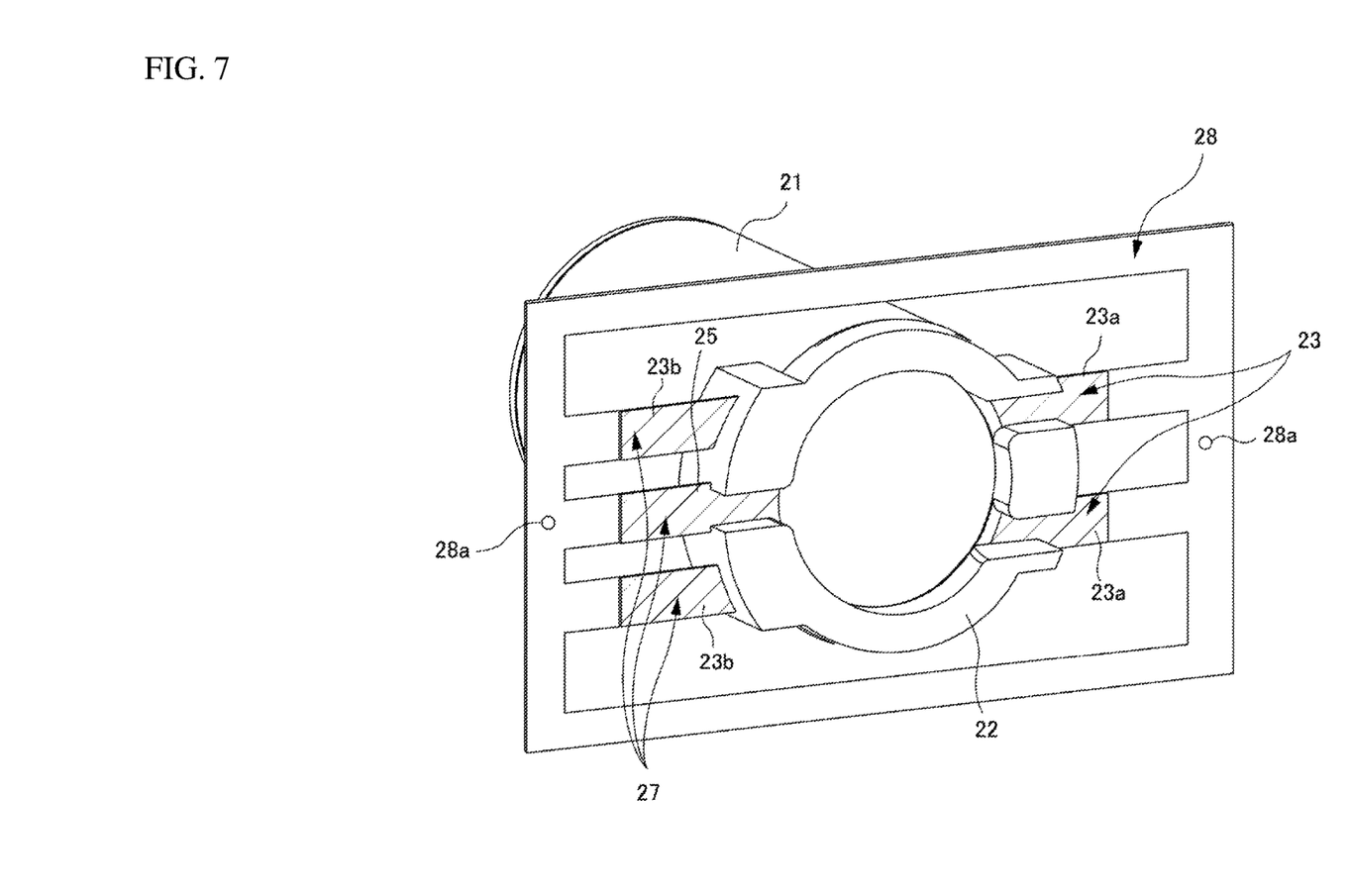
FIG. 7 is a perspective view illustrating a state in which the stator core and the portion of the terminal part which becomes a terminal are integrated by the insulator in the molding step of the embodiment according to the present disclosure.

FIG. 7 is a perspective view illustrating a state in which portions (see the hatched area) that become the stator core 21, the terminals 23 and the short terminal 25 of the terminal parts 27 are integrated by the insulator 22 in the molding step.

Note that lines indicating that the electromagnetic steel sheets of the stator core 21 are laminated are omitted in FIG. 7.

As shown in FIG. 7, when the portions (see the hatched area) that become the stator core 21, the terminals 23 and the short terminal 25 of the terminal parts 27 are integrated by the insulator 22 are formed, a cutting step of cutting the terminal parts 27 is performed next so as to form the distal end portions 23a of the terminals 23 housed in the housing parts 34a of the aforementioned casing block 34 is performed.

Note that in this cutting step, the terminal parts 27 are also cut so as to form the rear end portions 23b of the terminals 23 and the short terminal 25.

When such a manufacturing method is adopted, the two terminals 23 and one short terminal 25 are formed not individually but in a state of the lead frame in the manufacturing step, providing an advantage that it is easier to handle the two terminals 23 and one short terminal 25.

Furthermore, it is possible to provide the two terminals 23 to be connected to the frame 28 and form the distal end portions 23a of the terminals 23 so that the portions being led out from the insulator 22 are appropriately left, and it is therefore also possible to improve the utilization efficiency of the material.

Once a part into which the stator core 21, the two terminals 23 and the short terminal 25 are integrated via the insulator 22 is manufactured, the separately manufactured coil 24 is housed in the center of the part as shown in FIG. 3, the end portions 24a of the coil 24 are welded and connected to the corresponding two terminals 23 and the short terminal 25, resulting in a state of the stator 20.

Next, the assembly of the rotor 10 and the stator 20 as shown in FIG. 1 is manufactured.

More specifically, the portion of the rotor 10 before the first bearing 13 and the spring 15 are provided is inserted from the second end side (left side in the figure) of the stator 20 into the stator 20, the first bearing 13 is fixed on the first end side (right side in the figure) of the shaft 11 which is led out from the first end side (right side in the figure) of the stator 20 is fixed, and the assembly is thus brought into perfection.

When the assembly is manufactured in this way, the casing block 34 is then attached so that the distal end portions 23a of the terminals 23 of the stator 20 are housed in the housing parts 34a (see FIG. 2).

The assembly with the casing block 34 attached is inserted from the open end on the first end side (right side in the figure) of the casing body 31 into the casing body 31, the outer wheel 14b of the second bearing 14 is press-fitted into the fixing part 31ca of the casing body 31 and the casing block 34 is press-fitted into the opening 31a (see FIG. 2) of the casing body 31.

Next, the casing end face part 32 is disposed on the first end side (right side in the figure) of the casing body 31 so that the first bearing 13 is loose-fitted into the through hole 32a and the spring 15 is attached on the first end side of the first bearing 13 located on the first end side of the through hole 32a (right side in the figure).

Lastly, the casing cap 33 that receives the spring 15 is disposed on the first end side (right side in the figure) of the casing end face part 32, the casing end face part 32 and the casing cap 33 are jointly fastened and thereby fixed to the casing body 31 using screws (not shown).

Note that as shown in FIG. 2, through holes 33b for the above-described screws to pass through are formed in the casing cap 33 and the casing end face part 32 is also provided with through holes (not shown) for screws to pass through at positions corresponding to the through holes 33b.

Screw fixing holes (not shown) in which threaded grooves for screw connection are formed are formed on the end face on the first end side (right side in the figure) of the casing body 31.

Since the motor 1 according to the present embodiment in the above-described configuration can efficiently dissipate heat generated in the coil 24, even when a large amount of current is supplied to the coil 24, it is possible to suppress an increase of the resistance value caused by a temperature rise of the coil 24.

Thus, it is possible to supply a large amount of current and rotate the rotor 10 at a high speed and improve output of the motor 1.

An increase in the resistance value of the coil 24 means that current is converted to heat and power loss is produced, and therefore the motor 1 according to the present embodiment capable of suppressing such an increase of the resistance value provides high power utilization efficiency as well.

Furthermore, compared to a case where the casing 30 is only provided with an opening, the configuration in which the opening 31a is closed with the casing block 34 makes it possible to keep dust-proof performance high.

The present disclosure has been described based on an embodiment so far, but the present disclosure is not limited to the embodiment.

For example, it may be possible to measure a temperature of the coil 24 using the distal end portions 23a of the terminals 23 provided to improve heat dissipation performance.

Figure 8:
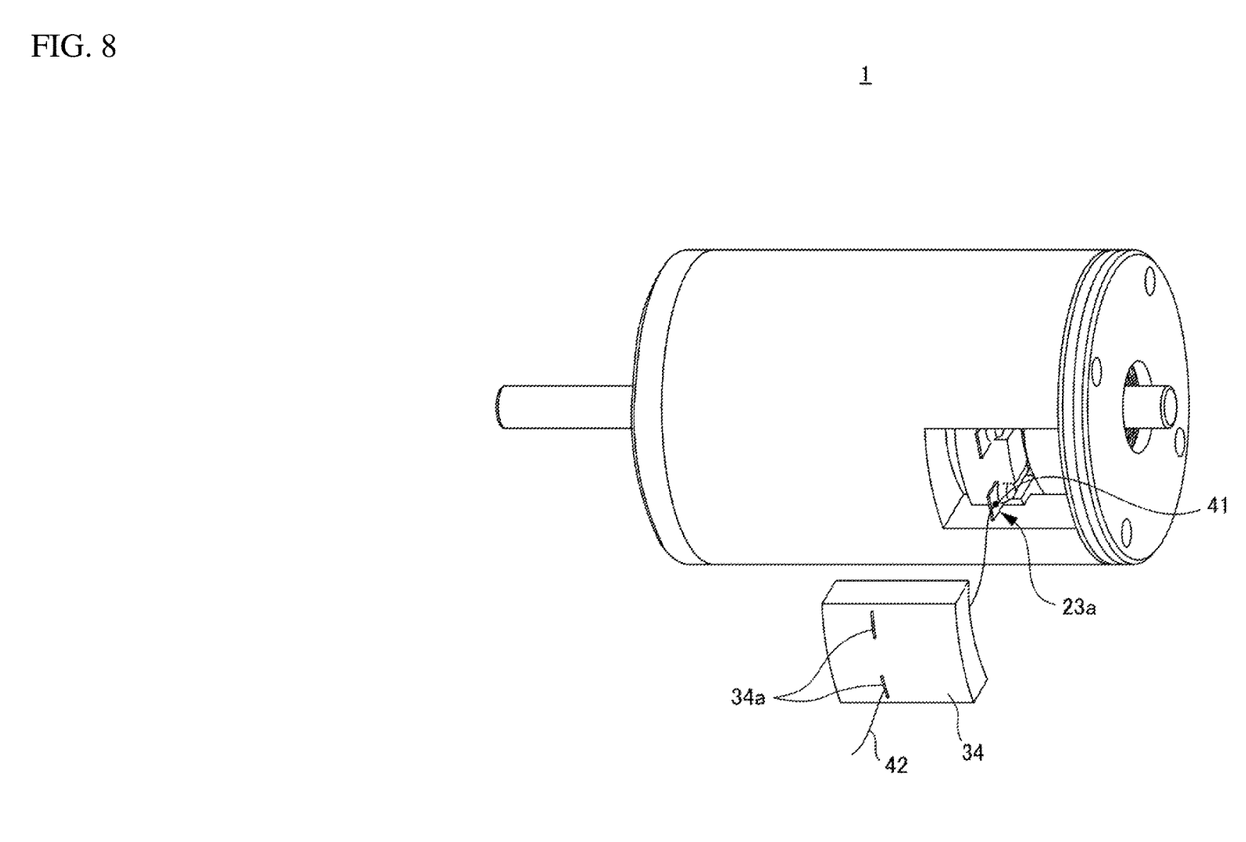
FIG. 8 is a diagram for describing an example of application whereby a coil temperature is made measurable using the distal end portion of the terminal according to the embodiment of the present disclosure.

FIG. 8 is a diagram illustrating an example of application in which it is possible to measure a temperature of the coil 24 using the distal end portion 23a of the terminal 23.

As shown in FIG. 8, a temperature sensor 41 (e.g., thermocouple temperature measuring instrument) is attached to the distal end portions 23a of the terminals 23 and a signal line 42 which is led out from the temperature sensor 41 is extracted out of the motor 1 via the housing parts 34a of the casing block 34.

Since the end portions 24a of the coil 24 are directly connected to the terminal 23 as described above, the terminal 23 has substantially the same temperature as that of the coil 24.

For this reason, it is possible to detect a temperature condition of the coil 24 by providing the temperature sensor 41 as described above and measuring the temperature condition of the terminal 23.

When the temperature of the coil 24 is high, it is possible to perform control such as a reduction of the amount of current supply based on the measured temperature and it is thereby possible to perform more accurate drive control of the motor 1.

However, how to use the temperature measured by the temperature sensor 41 may be determined appropriately as needed and need not always be used for drive control.

Thus, the present disclosure is not limited to specific embodiments, but can be changed in various ways without departing from the spirit and scope of the present disclosure, which is obvious to those skilled in the art from the description of the scope of claims.

What is claimed is:

1. A motor comprising:
   a stator comprising a terminal; and
   a casing that houses the stator,
   wherein the terminal has a rear end portion connected to a stator coil and a distal end portion opposite the rear end portion, and the terminal transmits heat from the stator to the casing,
   wherein the casing comprises:
      a casing body housing the stator, wherein the casing body comprises a material having a coefficient of thermal conductivity of at least 1 W/m·k, and further comprises an opening in which the distal end portion of the terminal is disposed, and
      a casing block disposed in the opening and having an insulating property wherein the casing block comprises a material having a coefficient of thermal conductivity of at least 1 W/m·k, and
   the casing block comprises a housing part that houses the distal end portion of the terminal wherein heat is transmitted from the stator coil to the casing block via the terminal and to the casing body via the casing block.

2. The motor according to claim 1,
   wherein a flexible material is used for the casing block,
   the casing block is greater in size than the opening, and
   the casing block is press-fitted into the opening.

3. The motor according to claim 1,
   wherein the casing block is smaller in size than the opening, and
   a gap between the casing block and the opening is filled with a member with high thermal conductivity.

4. The motor according to claim 1,
   wherein the housing part is smaller in size than the distal end portion of the terminal, and
   the distal end portion of the terminal is press-fitted into the housing part.

5. The motor according to claim 1,
   wherein the housing part is greater in size than the distal end portion of the terminal, and
   a gap between the housing part and the distal end portion of the terminal is filled with a member with high thermal conductivity.

6. The motor according to claim 1,
   wherein the stator comprises a cylindrical stator core,
   the terminal comprises:

the distal end portion;
the rear end portion on an opposite side of the distal end portion; and
a bridge part that bridges the distal end portion and the rear end portion, and the bridge part has an arc shape along an end face of the stator core.

7. The motor according to claim 6, further comprising:
two of the terminals disposed separate from each other; and
one short terminal that constitutes a portion similar to the rear end portion of the terminal,
wherein the two terminals are disposed so that the rear end portion is located on a same side of the stator, and
the short terminal is separate from the two terminals and provided so as to be located between the rear end portions of the two terminals.

8. The motor according to claim 1, further comprising at least one temperature sensor,
wherein the temperature sensor is attached to the terminal.

9. The motor according to claim 1, wherein the housing part is a bottomed concave part comprising an insertion port for the distal end portion of the terminal inside the casing.

10. A method for manufacturing the motor according to claim 1, the method comprising:
an arranging step of arranging the stator core in a metal die, causing the metal die to hold a frame of a lead frame comprising (i) a terminal part and (ii) a frame that holds the terminal part and arranging the lead frame in the metal die;
a molding step of supplying an insulator material to the metal die, insulating a portion that becomes a terminal of the terminal part from the stator core and molding an insulator that integrates the terminal and the stator core; and
a cutting step of cutting the terminal part so as to form the distal end portion of the terminal housed in the housing part of the casing block.

* * * * *